US009240714B2

(12) United States Patent
Voutilainen et al.

(10) Patent No.: US 9,240,714 B2
(45) Date of Patent: Jan. 19, 2016

(54) VOLTAGE CONVERTER USING GRAPHENE CAPACITORS

(75) Inventors: Martti Kalevi Voutilainen, Espoo (FI); Pirjo Marjaana Pasanen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 494 days.

(21) Appl. No.: 12/976,854

(22) Filed: Dec. 22, 2010

(65) Prior Publication Data
US 2012/0161731 A1    Jun. 28, 2012

(51) Int. Cl.
*H02M 3/07*    (2006.01)

(52) U.S. Cl.
CPC ...................... *H02M 3/07* (2013.01)

(58) Field of Classification Search
CPC ............... G05F 1/56; G05F 1/59; H02M 3/07
USPC .......... 323/225, 271, 273, 288, 364; 307/109, 307/110; 327/536; 363/59, 60, 62, 63
See application file for complete search history.

(56) References Cited

U.S. PATENT DOCUMENTS

| 5,034,676 | A | 7/1991 | Kinzalow | |
|---|---|---|---|---|
| 6,487,095 | B1 | 11/2002 | Malik et al. | |
| 7,388,357 | B2 * | 6/2008 | Mitter et al. | 323/282 |
| 7,919,953 | B2 * | 4/2011 | Porter et al. | 323/222 |
| 2010/0026252 | A1 | 2/2010 | Lin et al. | |
| 2010/0117614 | A1 * | 5/2010 | Bandholz et al. | 323/283 |
| 2010/0254149 | A1 | 10/2010 | Gill | |
| 2010/0271140 | A1 | 10/2010 | Raghunathan et al. | |

FOREIGN PATENT DOCUMENTS

| CN | 101894679 A | 11/2010 |
|---|---|---|
| EP | 2090256 A2 | 8/2009 |
| JP | 2010245797 A | 10/2010 |
| WO | WO 2010052610 A1 * | 5/2010 |

OTHER PUBLICATIONS

"Density of States and Zero Landau Level Probed through Capacitance of Graphene," Ponomarenko, L. A.; Yang, R.; Gorbachev, R. V.; Blake, P.; Mayorov, A. S.; Novoselov, K. S.; Katsnelson, M. I.; Geim, A. K., Physical Review Letters, vol. 105, Issue 13, id. 136801, Sep. 2010.*

"Mobility Extraction and Quantum Capacitance Impact in High Performance Graphene Field-effect Transistor Devices," Z. Chen and J. Appenzeller, Electron Devices Meeting, 2008. IEDM 2008. IEEE International, Dec. 15-17, 2008, p. 1-4.*

(Continued)

*Primary Examiner* — Fred E Finch, III
*Assistant Examiner* — Jye-June Lee
(74) *Attorney, Agent, or Firm* — Mintz Levin Cohn Ferris Glovsky and Popeo, P.C.

(57) ABSTRACT

The subject matter disclosed herein provides an apparatus for smoothing an output signal. The apparatus comprising can include an input, an output, one or more voltage regulator circuit components, and one or more graphene capacitors. The voltage regulator circuit components can be configured to provide for a change in the voltage level of signalling between the input and the output. The one or more graphene capacitors can be configured to provide for smoothing of the signalling provided to the output. Related methods, systems, techniques, and articles are also described.

17 Claims, 7 Drawing Sheets

(56) References Cited

OTHER PUBLICATIONS

"Measurement of the quantum capacitance of interacting electrons in carbon nanotubes," S. Ilani, L. A. K. Donev, M. Kindermann, and P. L. McEuen, Nature Physics, vol. 2, No. 10, pp. 687-691, 2006.*

"Effect of substrate doping profile on C-V curves for thin MOS capacitors," Simonetti, O., Maurel, T., and Jourdain M., EPJ Applied Physics, 14, p. 127-130, 2001.*

"The Effect of Doping Density and Injection Level on Minority-Carrier Lifetime as Applied to Bifacial Dendritic Web Silicon Solar Cells," D. Meier, J.M. Hwang, R. Campbell, IEEE Transactions on Electron Devices, vol. ED-35, No. 1, Jan. 1988.*

"High/Ultra-High Resistivity Paper," SunEdison Semiconductor, Oct. 2003, http://www.sunedisonsemi.com/assets/file/products/advanced-materials/hi-low%20res_rev10102003.pdf.*

Castro, V. E., "Tunable gap and quantum quench dynamics in bilayer graphene"; Jul. 13, 2010, Mathematica Summer School.

Ponomarenko et al. "Density of states and zero Landau level probed through capacitance of graphene"; Nature Nanotechnology Letters; Jul. 5, 2009; DOI: 10.1038/NNANO.2009.177.

Sony, News Release: http://www.sony.net/SonyInfo/News/Press/201010/10-137E/index.html Oct. 7, 2010.

International Search Report and Written Opinion dated Nov. 25, 2011, in connection with corresponding International Application No. PCT/FI2011/050800.

* cited by examiner $$R_{EQUIV} = \frac{1}{fC1}$$

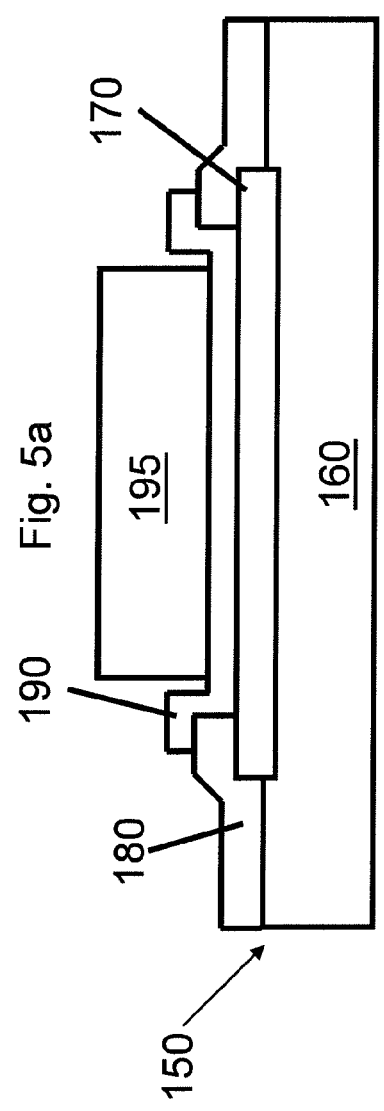
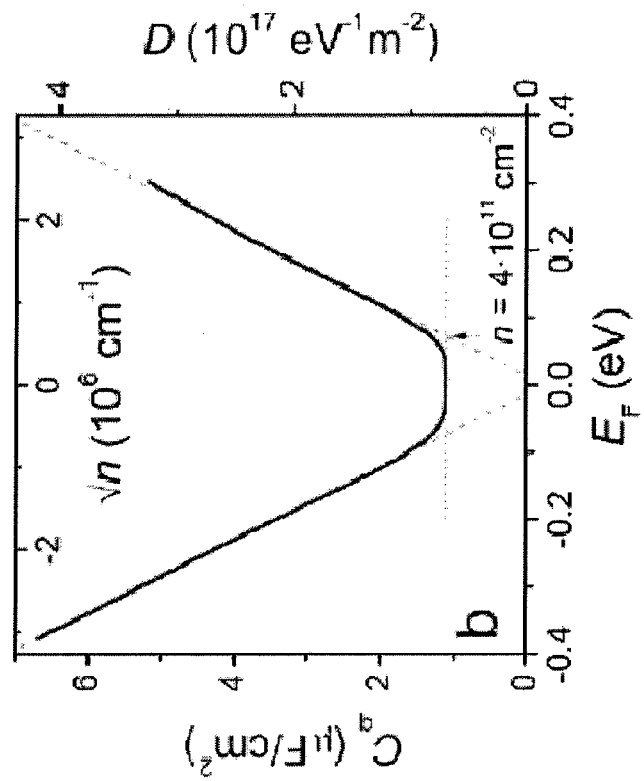
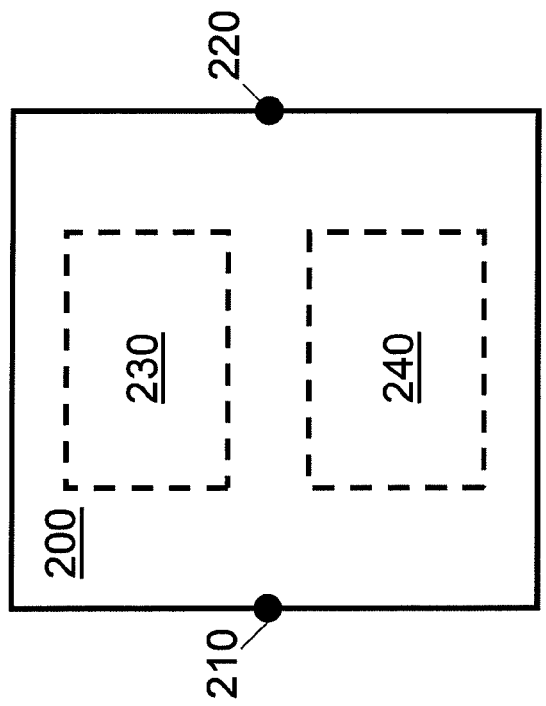

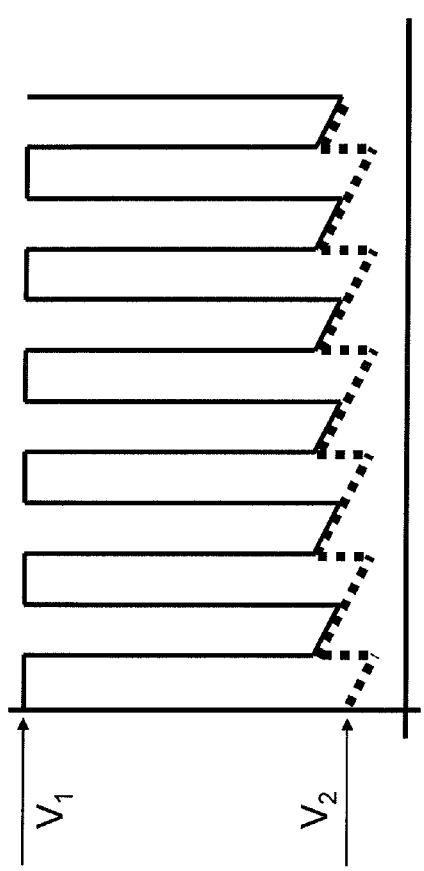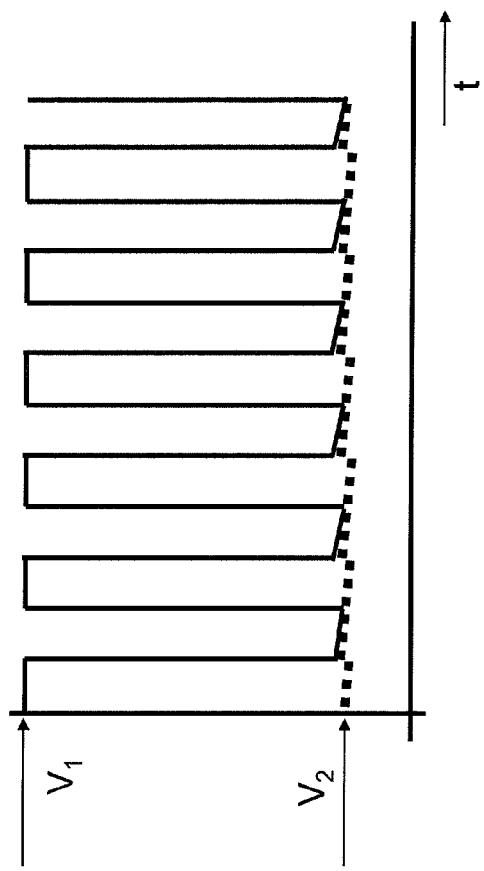

x axis = eV
y axis = pF

VOLTAGE CONVERTER USING GRAPHENE CAPACITORS

TECHNICAL FIELD

The present disclosure relates to the field of voltage regulation, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (for example, tele-communication, video-communication, and/or text transmission (Short Message Service (SMS)/Multimedia Message Service (MMS)/emailing) functions), interactive/non-interactive viewing functions (for example, web-browsing, navigation, TV/program viewing functions), music recording/playing functions (for example, MP3 or other format and/or (FM/AM) radio broadcast recording/playing), downloading/sending of data functions, image capture function (for example, using a (for example, in-built) digital camera), and gaming functions.

BACKGROUND

Power converters are useful in a number of applications, for example, where the power or voltage supply for a device (such as a personal computer or the like) cannot be directly used by a particular circuit/sub-circuit within that device. The power supply needs to be changed from one voltage level to another in order to be suitable to power the circuit. One such type of power converter is a switching DC-DC regulator. Switching regulators or switched-mode regulators are efficient when used in accordance with their design parameters, but periodic loading of capacitors within such regulators can cause ripples in the voltage output when a connected load consumes power from the output stage capacitor.

In addition, the periodic loading (typical frequencies are at 100 kHz-100 MHz, in the future these frequencies are likely to extend even higher) generates high-frequency electromagnetic disturbances. Additional voltage regulation methods are often employed to help to stabilise the output voltage on a pico-second time scale, and to keep the effective regulator output impedance low.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus comprising:
an input;
an output;
one or more voltage regulator circuit components configured to provide for a change in the voltage level of signalling between the input and the output; and
one or more graphene capacitors configured to provide for smoothing of the signalling provided to the output.

At least one of the one or more graphene capacitors is provided proximate to the output to smooth the signalling provided to the output.

The signalling may be direct current.

At least one of the one or more graphene capacitors may be configured to act as an output stage capacitor with the voltage regulator circuit components.

The voltage regulator circuit components may comprise a plurality of switches configured to provide for switched charging of the one or more graphene capacitors to thereby provide for smoothing of the signalling.

The voltage regulator circuit components may comprise at least one non-graphene capacitor, and the switches are configured to provide for switched charging of the at least one non-graphene capacitor.

The one or more graphene capacitors may be configured to have a capacitance that is dependent on the voltage applied to that respective capacitor.

The graphene capacitor may be biased so that the capacitance of the capacitor varies proportionally with applied voltage.

At least one of the one or more graphene capacitors may be provided proximate to the input to enhance efficiency of the signalling smoothing.

The voltage regulator circuit components may comprise a low dropout (LDO) regulator provided proximate to the input to enhance efficiency of the signalling smoothing.

The smoothing of the signalling at the output may be provided at least in part by the kinetic energy of the charge carriers of the one or more graphene capacitors provide.

The smoothing of the signalling at the output may comprise one or more of the following:
increased smoothness, enhanced smoothness, increased linearity, decreased rippling, and decreased ripple amplitude.

In another aspect, there is provided a method comprising:
receiving signalling at an input;
changing the voltage level of the received signalling between the input and an output;
smoothing the voltage of the signalling using one or more graphene capacitors;
providing smoothed signalling at the output.

In another aspect, there is provided a method comprising:
assembling together an input, an output, one or more voltage regulator circuit components and one or more graphene capacitors together to provide an apparatus, wherein the one or more voltage regulator components are configured to provide for a change in the voltage level of signalling between the input and the output, and the one or more graphene capacitors are configured to provide for smoothing of the signalling provided to the output.

In yet another aspect, there is provided an apparatus comprising:
means for receiving signalling;
means for outputting signalling;
means for voltage regulation configured to provide for a change in the voltage level of signalling between the means for receiving signalling and the means for outputting signalling; and
means for capacitively storing charge, said means being formed from graphene and being configured to provide for smoothing of the signalling provided to the means for outputting signalling.

In another aspect, there is provided a non-transitory computer readable medium comprising computer program code stored thereon, the computer program code being configured to, when run on a processor, perform at least the following:
   determine a bias to be applied to a graphene capacitor to provide for smoothing of signalling provided to an output, the bias to be applied being determined based on:
   voltage level of the signalling provided at the input, voltage level of the signalling required at the output, and parameters of one or more voltage regulator circuit components configured to provide for a change in the voltage level of signalling between an input and the output.

The computer program code may also be configured to, when run on a processor, allow for provision and/or application of the determined bias to a graphene capacitor.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:

FIG. 5a illustrates a first embodiment of the present disclosure.
FIG. 5b illustrates a further embodiment of the present disclosure.
FIG. 6 illustrates the physical response of an embodiment of the present disclosure.
FIG. 7 illustrates the functional operation of an embodiment.
FIG. 8 shows an example of an embodiment in operation.

DESCRIPTION OF EXAMPLE ASPECTS/EMBODIMENTS

In one or more embodiments described herein, there is provided an apparatus comprising an input, an output, one or more voltage regulator circuit components, and one or more graphene capacitors. The voltage regulator circuit components are configured to provide for a change in the voltage level of signalling between the input and the output. The one or more graphene capacitors are configured to provide for smoothing of the signalling provided to the output.

By using graphene capacitors with switching/switched-mode regulators or regulator circuit components, it is possible to obtain smoother output signalling than where non-graphene or normal/standard capacitors are used. This is possible because graphene capacitors respond in a different way to applied voltage than normal capacitors. Instead of having a constant capacitance, the capacitance of graphene capacitors actually varies in relation to the voltage to the graphene capacitor in question, which allows for enhanced smoothing of the output signalling. This is discussed in detail below.

Figure 1:
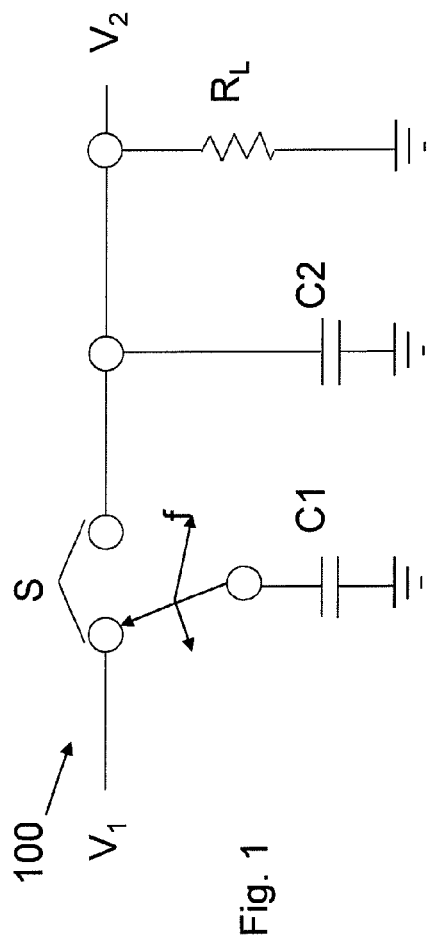
FIG. 1 shows an example of a voltage regulator.
Figure 2:
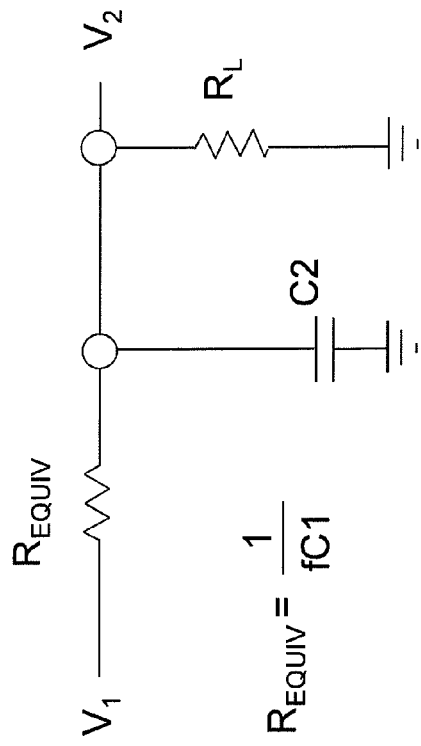
FIG. 2 shows another example of a voltage regulator.

FIGS. 1 and 2 illustrate the operation of a basic switched-capacitor building block. This is helpful in order to understand the operation of more complicated switched-mode regulators (for example, some chip/integrated-circuit based regulators, such as the LT1054 chip regulator shown in FIG. 3).

A simple switched-capacitor building block or network is shown in FIG. 1. V1 is the input providing voltage at one level, and V2 is the output that voltage is to be provided to at another voltage level. The switch S is responsible for controlling the provision of voltage from the V1 side of the network to the V2 side of the network. Capacitors C1 and C2, and resistor $R_L$ affect the voltage provided at the output.

When the switch S is in the left position, capacitor C1 charges to the voltage at V1. The charge on C1 is q1=C1×V1. When the switch is moved to the right, C1 is discharged to the voltage at V2. After discharging, the charge on C1 is q2=C1×V2. As a result, it can be seen that charge has been transferred from the source V1 to the output V2. The amount of charge transferred is shown in equation 1 below:

$$\Delta q = q1 - q2 = C1(V1 - V2) \qquad (1)$$

If the switch is cycled f times per second, (in other words at frequency f Hz), the charge transfer per unit time (current) is as shown in equation 2:

$$I = f \times \Delta q = f \times C1(V1 - V2) \qquad (2)$$

From this equation, it is possible to obtain an equivalent resistance for a switched capacitor network. The equation is therefore rewritten in terms of voltage and impedance equivalence as shown in equation 3.

$$I = \frac{V1 - V2}{(1/fC1)} = \frac{V1 - V2}{R_{EQUIV}} \qquad (3)$$

This equivalent resistance, $R_{EQUIV}$, is therefore defined as $R_{EQUIV} = 1/(f \times C1)$. The equivalent circuit for the switched capacitor network is shown in FIG. 2.

These simplified circuits explain voltage loss as a function of oscillator. As oscillator frequency is decreased, the output impedance is eventually dominated by the 1/fC1 term and voltage losses rise.

Voltage losses also rise as oscillator frequency increases. This is caused by interval switching losses that occur due to some finite charge being lost on each switching cycle. This charge loss per unit cycle, when multiplied by the switching frequency, becomes a current loss. At high frequency, this loss becomes significant and voltage losses again rise.

To combat this, the oscillation of the switching can be controlled so as to run in a frequency range/band where voltage losses are at reduced or minimised. For example, the LT1054 chip is designed to be utilised in regulator circuits so as to ensure switching frequency operates in such an optimal range.

Figure 3:
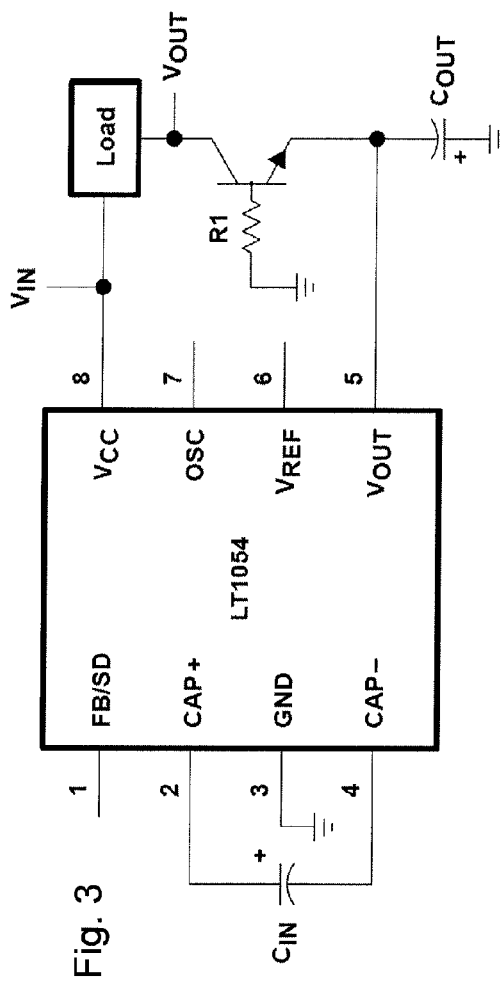
FIG. 3 shows another example of a voltage regulator.

FIG. 3 illustrates a regulator circuit that utilises this chip. As illustrated, LT1054 has 8 pins:
1—FB/SD
2—CAP+
3—GND
4—CAP−
5—$V_{CC}$
6—OSC
7—$V_{REF}$
8—$V_{OUT}$ To provide the voltage regulation function, the chip is connected in the following way.

Pins 2 and 4 are connected together via capacitor $C_{IN}$.
Pin 3 is connected to ground.
Pin 8 is connected to $V_{IN}$ and also to a load positioned after $V_{IN}$.
After the load, $V_{OUT}$ is connected into the circuit.
Pin 5 is connected to $V_{OUT}$ via a transistor T1.
Transistor T1 is connected to ground at its base via a resistor R1.
Pin 5 is also connected to a capacitor $C_{OUT}$ which is in turn connected to ground.

When in operation, supply voltage $V_{CC}$ alternately charges $C_{IN}$ to the input voltage when $C_{IN}$ is switched in parallel with the input supply and then transfers charge to $C_{OUT}$ when $C_{IN}$ is switched in parallel with $C_{OUT}$. Switching occurs at the oscillator frequency. During the time that $C_{IN}$ is charging, the peak supply current is approximately 2.2 times the output current. During the time that $C_{IN}$ is delivering a charge to $C_{OUT}$, the supply current drops to approximately 0.2 times the output current. An input supply bypass capacitor supplies part of the peak input current drawn by the LT1054, and averages out the current drawn from the supply. A minimum input supply bypass capacitor of 2 µF, preferably tantalum or some other low equivalent-series-resistance (ESR) type, is commonly used. A larger capacitor is desirable in some cases. An example of this would be when the actual input supply is connected to the LT1054 through long leads or when the pulse currents drawn by the LT1054 might affect other circuits through supply coupling.

In addition to being the output terminal, $V_{OUT}$ is tied to the substrate of the device. Special care must be taken in LT1054 circuits to avoid making $V_{OUT}$ positive with respect to any of the other terminals. For circuits with the output load connected from $V_{CC}$ to $V_{OUT}$ or from some external positive supply voltage to $V_{OUT}$, an external transistor T1 must be added (see FIG. 3). This transistor prevents $V_{OUT}$ from being pulled above GND during start up. Any small general purpose transistor (for example, such as a 2N2222 or a 2N2219 device can be used). Resistor R1 should be chosen to provide enough base drive to the external transistor so that it is saturated under nominal output voltage and maximum output current conditions.

Additional voltage regulation can be provided using linear regulators, although these can increase the overall power consumption and total cost.

Figure 4:
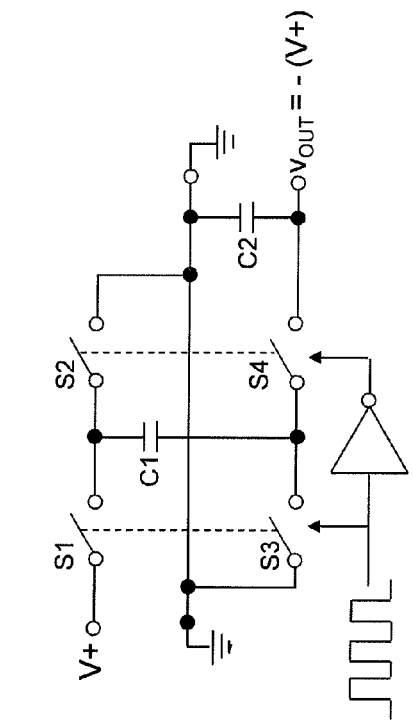
FIG. 4 illustrates the functionality of voltage regulators.

FIG. 4 shows another illustration of a voltage regulator. There are two sets of relay switches that selectively connect capacitors C1 and C2. A functional NOR circuit uses a square wave to open and close the switches in accordance with the square wave signal. Closing S1 and S3 charges the first 'flying' capacitor, C1 (proximate to the input), to V+ in the first half cycle. In the second half, S1 and S3 open and S2 and S4 close. This action connects the positive terminal of C1 to ground and connects the negative terminal to $V_{OUT}$. C1 is then in parallel with the second 'reservoir' or output stage capacitor C2 (proximate to the output). If the voltage across C2 is smaller than that across C1, charge flows from C1 to C2 until the voltage across C2 reaches −(V+).

As has been discussed above, it is important to keep the output voltage stable on a picosecond time scale with voltage-mode drivers that are used in some differential serial links, for example, like MIPI D-PHY and M-PHY. For example, some high megapixel image sensors (for example, CMOS sensors) use four or more MIPI D-PHY lanes. When the output driver is made from voltage-mode drivers, the output buffers need a voltage supply on the order of 100s of mV but that may need to be generated from a power supply that is on the order of 1 V. If a linear regulator was to be used instead of a switched-mode regulator, or if the drivers were current-mode drivers, power consumption of output buffers would be on the order of 10 times larger.

We will now begin to describe a first embodiment of the present disclosure with reference to FIG. 5a. FIG. 5a illustrates a graphene capacitor 150.

The example graphene capacitor 150 shown in FIG. 5a comprises a dielectric substrate 160, a layer of graphene 170, metallic contacts 180, dielectric layer 190, and a top gate 195.

The dielectric substrate 160 is, in this example, a silicon wafer. It will be appreciated by the skilled person that other dielectric substrates can be used. The dielectric layer 190 can be for example a metal oxide layer (as it is in this embodiment) with high dielectric constant.

On top of this is formed the graphene layer 170. The width of the graphene layer 170 is slightly narrower than the width of the substrate 160 so that the edges of the substrate 160 are exposed. On top of the exposed edges of the substrate 160 and also the extreme edges of the graphene layer 170 is formed the conductive contacts 180. In this example these are formed from gold and/or titanium though other conductive and/or metallic materials may also be used. These act as input and output terminals of the graphene capacitor 150. The metal oxide layer 180 (which in this example is aluminium oxide) is formed on top of the exposed layer of graphene 170. This helps to insulate the graphene layer 170 and other layers from the next layer (the top gate 195). The top gate 195 is then formed on top of the metal oxide layer 190. The top gate 195 is usable to apply a charge to so as to bias the graphene layer 170 and control the response of the capacitor 150. This will be described in more detail below.

Unlike normal non-graphene capacitors, graphene capacitors 150 have a variable capacitance. In this example of the graphene capacitor 150, the capacitance is directly related to an applied voltage that is experienced by the capacitor.

The voltage dependency of such a graphene capacitor is shown in FIG. 6. In this figure, it can be seen that the capacitance of the example graphene capacitor 150 depends on the voltage as shown, and therefore C=C(V). The x axis shows the applied energy in eV (electron volts) that provides the capacitance shown on the y axis. Therefore, for a given eV voltage application, the corresponding capacitance can be determined from this chart. It will be appreciated that the relationship between the applied voltage and the corresponding capacitance can be changed and varied for example by change of substrate or dielectric materials, doping the graphene sheet or by varying the device structure, and need not be exactly as shown in FIG. 6 for all possible embodiments.

When placed in a switched-mode voltage regulator, the graphene capacitor has a surprising benefit on the overall operation of the regulator. This is illustrated in FIG. 5b. FIG. 5b shows an apparatus 200 having an input 210, output 220, voltage regulator circuit components 230, and a graphene capacitor 240. In this example, the voltage regulator circuit components 230 comprise components necessary to provide a voltage regulator function, and in this example they are laid out in the same manner as the voltage regulator of FIG. 4, although it will be appreciated that many other voltage regulator circuits and corresponding components could be used. The voltage regulator circuit components 240 are connected together and configured to provide for a change in the voltage level of signalling between the input 210 and the output 220.

The graphene capacitor 240 (in this embodiment), actually replaces what would otherwise be the normal non-graphene output capacitor $C_2$ of the voltage regulator shown in FIG. 4. Because the graphene capacitor's capacitance is dependent on the voltage applied to it, the capacitance increases during the loading period when the voltage across the capacitor $C_1$ is increased, and thus reduces peaks in the loading voltage. In effect, part of the loaded charge is "stored" in the increase of capacitance, and only a smaller amount goes towards increasing the voltage. This is based on the definition of capacitance which is C=dQ/dV, (where dQ is the change of stored charge and dV is the voltage difference) and therefore for a voltage dependent capacitance, then dQ=C(V)dV. The graphene capacitor is also configured (for example, by way of biasing the top gate) so that a decrease in voltage over the capacitor also causes a decrease in the capacitance. This capacitive response of the graphene capacitor can be seen in the curve of FIG. 6. It should be noted that further graphene capacitors can be provided and used in conjunction with the voltage regulator circuit components 230 to further enhance smoothing of the signalling. This smoothing of the signalling and "increased" or "enhanced" smoothness can be compared to the smoothing that would normally be provided by non-graphene capacitors or standard/normal capacitors in such voltage regulator circuits.

Due to the extreme thinness of the graphene layer 170, the geometric capacitance of a graphene-based capacitor plate can be made to be relatively large compared to the quantum capacitance of graphene. As the total capacitance of any capacitor is calculated as a series capacitance of the geometric (oxide) capacitance and the quantum capacitance:

$$1/C = 1/C_{ox} + 1/C_Q \quad (4)$$

Therefore, when the geometric capacitance is large relative to the quantum capacitance, the total capacitance is dominated by the quantum capacitance component.

Quantum capacitance is determined by the quantum mechanical density of states:

$$C_Q = e^2 D(E) = e^2 dn/dE \quad (5)$$

This is measured at the Fermi energy $E_F$ (here n is the charge density and E is the energy). For graphene, the density of states depends strongly on the $E_F$, and can therefore be tuned by external means, for example, via the voltage applied to the top gate 195. Since the geometric capacitance has a negligible effect on the total observed capacitance, the tuning of the quantum capacitance implies that the total capacitance can also be tuned easily by external means, such as a top gate. This is in contrast to capacitors made of other materials, where the geometric capacitance usually dominates and the total capacitance C can not be tuned easily.

When biased such that reducing the voltage also reduces the capacitance (this is illustrated by the curve in FIG. 6) the voltage over capacitance is nearly constant and reduces only slightly, if capacitance dependence on voltage is selected properly. The energy used to keep the voltage relatively stable is coming from kinetic energy of the charge carriers of graphene and the same energy has to be loaded to the graphene capacitor during load period of the regulator. This helps to maintain an even current flow, and therefore a smooth voltage output. FIGS. 7 and 8 illustrate the difference that this can make to smoothing output voltage. FIG. 7 illustrates an example of a voltage regulator circuit with normal capacitors, and how it switches voltage level $V_1$ to $V_2$. $V_2$ output voltage has a pronounced saw tooth type ripple. However, when at least the output capacitor is replaced by a graphene capacitor, as is illustrated in FIG. 8 the output voltage $V_2$ has an increased/enhanced smoothness and reduced rippling.

The biasing around the suitable region in the curve in FIG. 6 can be done also by doping the substrate by some chemicals which raise or lower the Fermi level and charge density. The biasing can also be performed by one or more processors in combination with computer programs to provide for appropriate biasing of the graphene capacitor. This biasing can therefore help to achieve a more suitable or even an optimal capacitance function of the respective capacitors to enhance smoothing of the signalling provided to the output. For example, as per FIG. 6, or, in some embodiments, with one or more downward descending branches rather than two upward ascending branches as per FIG. 6. In essence, the biasing can be utilised to provide the graphene capacitor with a capacitance function desired for a particular application.

While some reverse biased silicon diodes can be made to have a voltage dependent capacitance, such diodes instead have an increase in capacitance when voltage decreases. These have to be biased with a high potential to achieve a reduction in capacitance when voltage decreases. In addition, the voltage supply is not especially stable using such components and it is not an effective at suppressing voltage spikes.

In summary, because of the voltage dependency of the graphene capacitor, the graphene capacitor is able to compensate for the energy loss that would otherwise occur when a normal capacitor is used by reducing the capacitance, and thus keeping the output voltage more stable by compensating for peaks and troughs in the voltage than when the capacitance is independent on voltage (as per standard capacitors). The capacitor therefore acts as a complex filter depending on the voltage being applied.

The efficiency of the capacitive dependency on voltage of the filtering function can be increased if the switched-mode regulator generates roughly the regulated voltage and relatively large fluctuations are allowed to keep capacitances small and thus can help reduce the surface area that would otherwise be required for a filtering circuit. In this case fine tuning the capacitive arrangement through using a linear low dropout regulator (LDO) or an additional voltage-dependent capacitor as near the load as possible (see FIG. 3) are typically required. This can provide for an improved power saving compared to using only standard linear regulation with an original typically large voltage.

As an example, to generate 1 mA current with 200 mV DC-level to load consumes (3.7V−0.2V)×1 mA=3.5 mW power, when only 0.2 mW is used for load, (assuming the linear regulator's input voltage is 3.7 V, which is typical of batteries/portable power supplies used in many mobile devices, and assuming regulation is performed using only a linear regulator). If rough regulation is performed by a switched capacitor regulator that provides a range of approximately 0.3V−0.4V with 90% efficiency (which is typical to optimized switched capacitor regulators) and fine tuning is performed by LDO to 200 mV, then only 0.1×(3.7V−0.5× (0.4+0.3))×1 mA=0.335 mW is lost during the switched-mode regulation and approximately 0.5×(0.4+0.3)×1 mA=0.35 mW in the LDO, altogether 0.685 mW. If regulation is performed by a switched-capacitor regulator from 3.7 V directly to 0.2V with 85% efficiency, regulation consumes 0.15×(3.7V−0.2V)×1 mA=0.525 mW, but then filtering capacitors or the switching frequency should be larger than in combined rough switched-capacitor regulation, that uses efficiently the voltage dependency of the graphene capacitor's capacitance, and also uses fine tuning through LDO regulation.

Advantages of one or more of the above embodiments are that it is possible to reduce radio frequency noise because the regulator output voltage has a reduced variation during the loading and unloading periods. Also the effective output impedance of the regulator is reduced, because the voltage is stable in all loading conditions, which is especially useful with voltage-mode drivers. Since no additional linear regulators are needed, the power saving can be up surprising, even up to 85% in some examples, and the cost of manufacture can be reduced.

In addition, there are benefits to using graphene instead of other voltage dependent capacitors (silicon based varactors, varicap diodes, etc):

Graphene does not need to be reverse biased;

The voltage dependency of the capacitor is different from that in varactors, where increasing the voltage (from the negative V side) increases the capacitance instead of decreasing it, as in FIG. 6; and Silicon diodes have to be biased against high potential to get the reduction of capacitance during the load period instead of increase in capacitance. Unfortunately, the voltage supply is not typically as stable as the ground, and can itself generate unwanted noise. Therefore, an upwards biased reverse diode is not a very effective spike suppressor.

It should be noted that the voltage applied to the top gate electrode can be used to bias the graphene capacitor and thereby alter the capacitance accordingly. In particular, it can be useful to apply a voltage to the top gate so that the capacitance of the capacitor approximates the optimum area presented in FIGS. 11 and 12 (as indicated by the arrow). The top gate can be used also be biased by an applied voltage to alter or change the density of states (e.g. increase, decrease, change the distribution of the density of states) and thereby change the quantum capacitance. The top gate can also be biased in such a way so as to increase electromagnetic capacitance and thereby increase the effect of the filtering function of the graphene capacitor due to the voltage dependent quantum capacitance if the electromagnetic capacitance is otherwise too low for effective filtering (electromagnetic and quantum capacitances are in series and the smaller one nominates the behavior).

Figure 15:
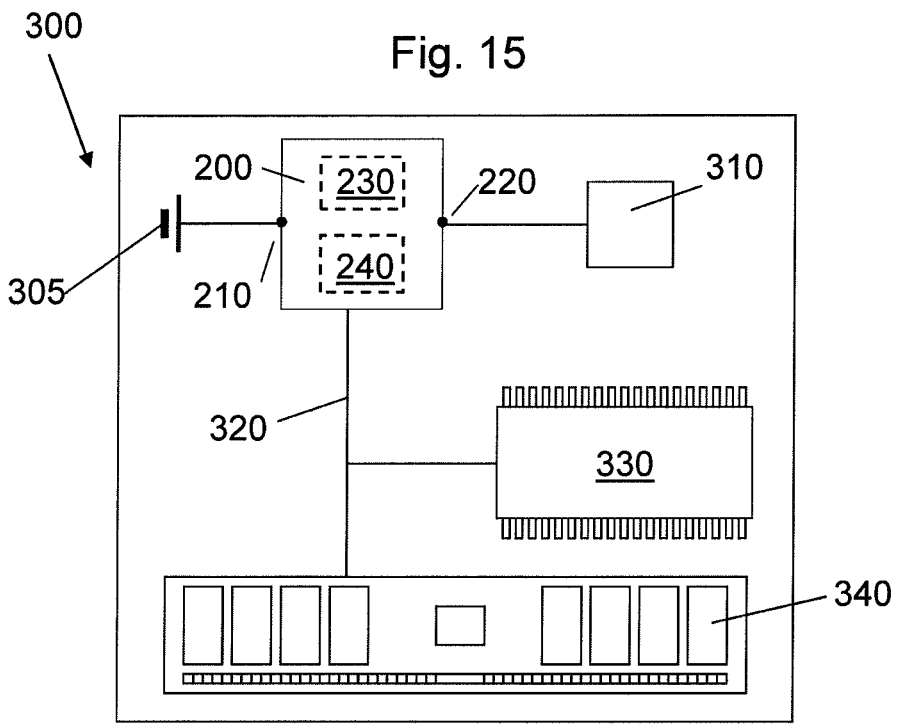
FIG. 15 illustrates another embodiment of the present disclosure.

FIG. 15 illustrates how the apparatus 200 of FIG. 5b can be implemented in a mobile device 300. FIG. 15 illustrates schematically a device 300 comprising the apparatus 200 described herein. The input 210 of the apparatus 200 is connected to a DC power source 305 that provides power at an input voltage ($V_1$) and the output 220 is connected to a sub-circuit 310 that needs power to be provided at a lower voltage level ($V_2$) than the DC power source 305. The apparatus 200 operates as described above to provide voltage output at a lower voltage level ($V_2$) for the sub-circuit 310.

This sub-circuit 310 and DC power source 305 are part of the device 300. The device 300 may be an electronic device, a portable electronic device, a portable telecommunications device, or a module for any of the aforementioned devices. The apparatus 200 can be provided as a module for such a device 300, or even as a processor for the device 300 or a processor for a module for such a device 300. The device 300 also comprises a processor 330 and a storage medium 340, which may be electrically connected to one another by a data bus 320.

The processor 330 is configured for general operation of the apparatus 200 by providing signalling to, and receiving signalling from, the other device components to manage their operation.

The storage medium 340 is configured to store computer code configured to perform, control or enable the making and/or operation of the apparatus 200. The storage medium 340 may also be configured to store settings for the other device components. The processor 330 may access the storage medium 340 to retrieve the component settings in order to manage the operation of the other device components. The storage medium 340 may be a temporary storage medium such as a volatile random access memory. On the other hand, the storage medium 340 may be a permanent storage medium such as a hard disk drive, a flash memory, or a non-volatile random access memory.

Figure 9:
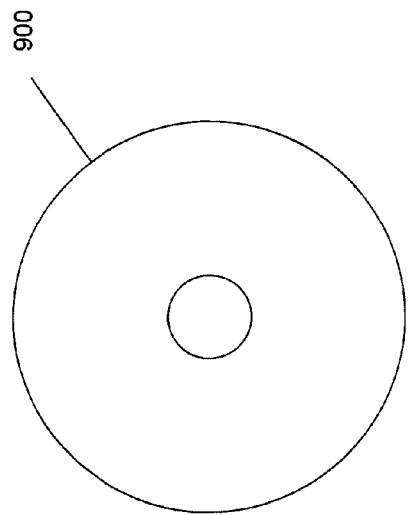
FIG. 9 illustrates schematically a computer readable media providing a program according to an embodiment of the present invention.

FIG. 9 illustrates schematically a computer/processor readable media 900 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function. In this particular figure, the CD is a non-transitory computer readable medium comprising computer program code stored thereon. The computer program code is configured to, when run on a processor, determine a bias to be applied to a graphene capacitor (as per one or more of the above embodiments) to provide for smoothing of signalling provided to an output. The bias to be applied is determined based on:

voltage level of the signalling provided at the input, voltage level of the signalling required at the output, and one or more parameters of one or more voltage regulator circuit components configured to provide for a change in the voltage level of signalling between an input and the output.

A parameter that can be considered can be switching frequency (for example, of switched-mode capacitor regulators), though the skilled person will appreciate that other parameters can also be considered. This biasing of the graphene capacitor helps to provide for a particular capacitance function or capacitance response of the graphene capacitor to particular signalling that it is to smooth.

FIGS. 10-14 illustrate a simulation of the operation of voltage regulator components arranged to provide a switched-mode regulator circuit.

Figure 10:
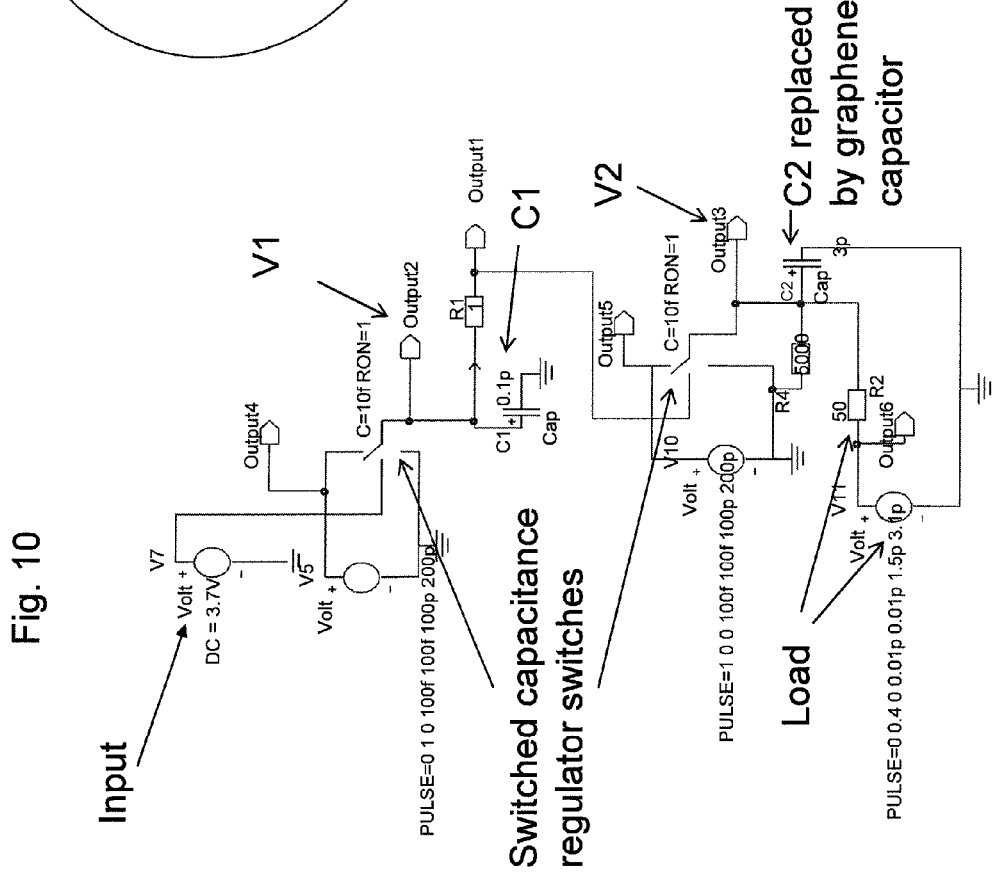
FIG. 10 illustrates an example of another regulator circuit.
Figure 14:
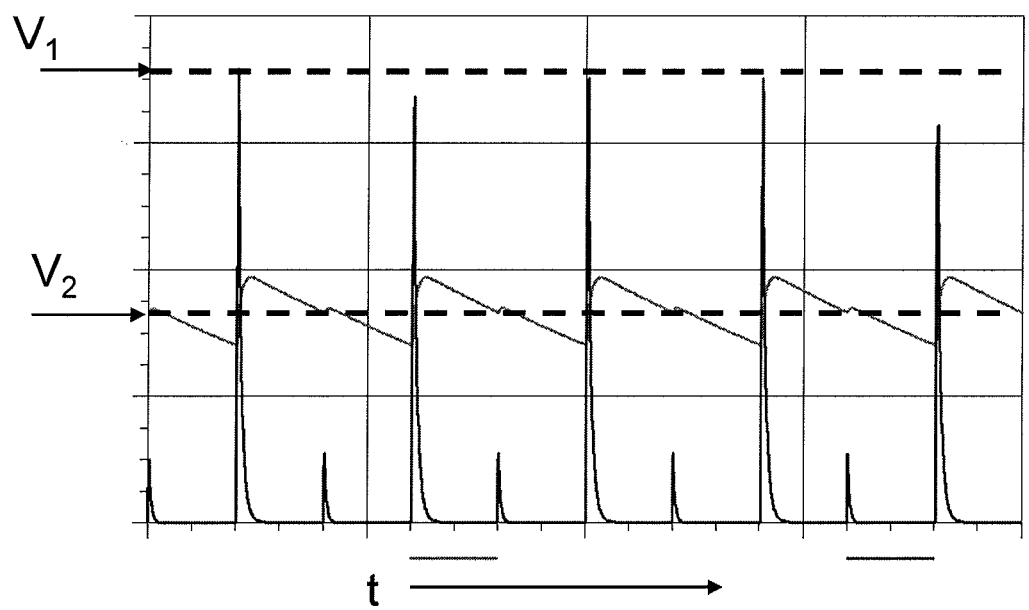
FIG. 14 illustrates voltage within a regulator circuit.

FIG. 10 illustrates an example switched mode regulator used in simulations of FIGS. 7 and 14 to illustrate a switched-capacitor regulator in general. The effect of the variable capacitance C2 in FIG. 10 was calculated by using the parameter:

$$\text{CAP VALUE} = 1pF(1 + 20 \text{abs}(V_2) - 5V_2^2)$$

The required output current of a differential line driver is typically 1-5 mA and the output voltage is around 200-500 mV. The voltage dependent capacitance of graphene is approximated in the following examples of this simulation (for example, by the second order polynomials in voltage).

Figure 11:
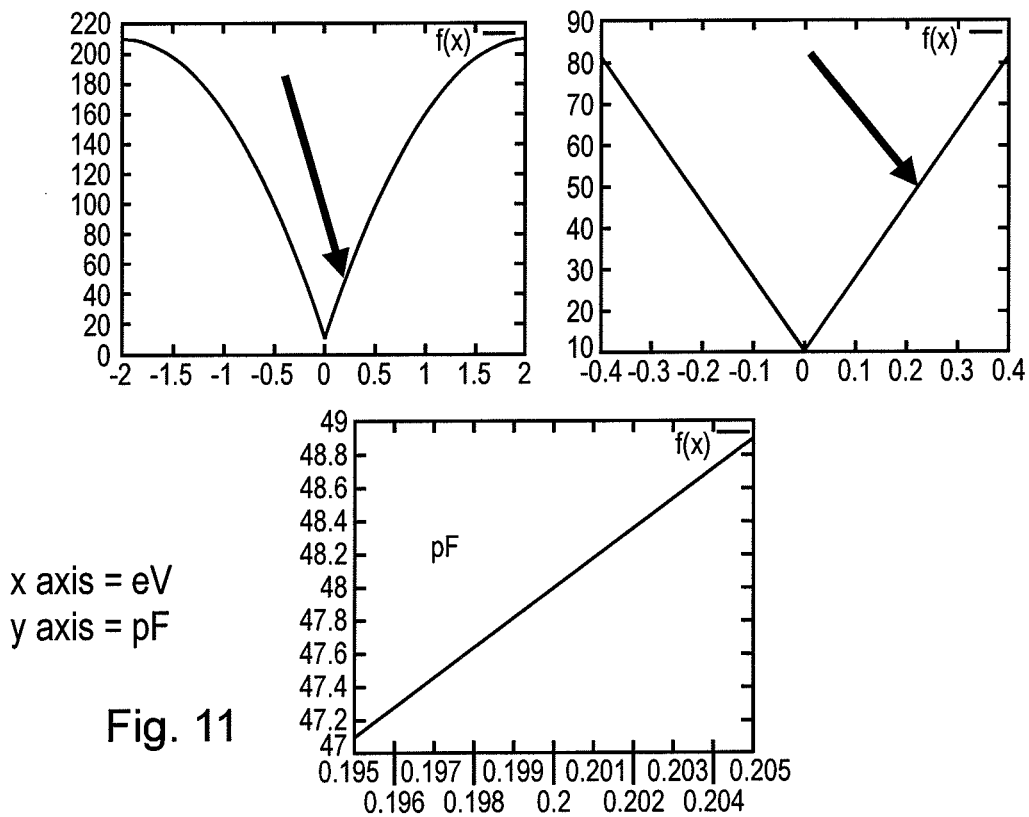
FIG. 11 illustrates capacitance function of a simulated regulator circuit.

FIG. 11 illustrates capacitance function $10*(1+20*\text{abs}(x)-5*x^2)$ in pF as a function on voltage over capacitor between −2V and +2V, −0.4 and +0.4V (same as in FIG. 6, wherein the x axis is in eV and the y axis is in pF), and at 195 mV and 205 mV (regulator working area) used in example. The regulator is biased into the area shown by arrow.

Figure 12:
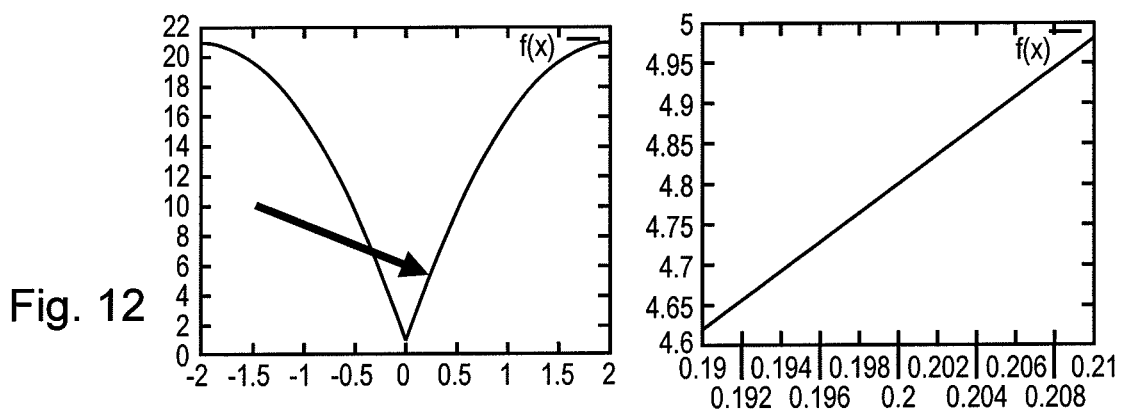
FIG. 12 illustrates another capacitance function of a simulated regulator circuit.

FIG. 12 illustrates another example, where there is a 20 mV variation in voltage over capacitor and the capacitance function used is $$1pF(1+20\text{abs}(V_1)-5V_1^2)$$

The energy of capacitance is:

$$E_C = \frac{1}{2}C \cdot V^2 \quad (8)$$

Charge stored in capacitance is Q=C·V. Energy of capacitance is conversed in the system and from capacitor is moved, when voltage is changed from $V_1$ to $V_2$, when capacitance is 1 pF(1+20 abs($V_1$)−5$V_1^2$) according to the FIG. 12, energy is moved from capacitor the amount of:

$$\frac{1}{2}C(V_1) \cdot V_1^2 - \frac{1}{2}C(V_2) \cdot V_2^2 = \frac{1}{2}\{[1 \text{ pF}(1 + 20 \cdot \text{abs}(V_1) - 5\ V_1^2)] \cdot V_1^2 - [1 \text{ pF}(1 + 20 \cdot [\text{abs}(V_2) - 5\ V_2^2)] \cdot V_2^2\}$$

If voltage changes from 210 mV to 190 mV, the energy taken from the voltage dependent capacitor is:

$$\frac{1}{2}\{[1 \text{ pF}(1 + 20 \cdot 210 \text{ mV} - 5 \cdot (210 \text{ mV})^2)] \cdot 210 \text{ mV}^2 - [1 \text{ pF}(1 + 20 \cdot 190 \text{ mV} - 5 \cdot (190 \text{ mV})^2)] \cdot 190 \text{ mV}^2\} =$$
$$\frac{1}{2}1 \text{ pF}[(1 + 4.2 - .2205) \cdot 210 \text{ mV}^2 - (1 + 3.8 - 0.1805) \cdot 190 \text{ mV}^2]$$

If the capacitor value would be constant and equal to value of variable capacitor with 200 mV:

$$1pF(1+20\cdot 200mV-5\cdot (200mV)^2)=4.8pf \quad (11)$$

Then the energy taken from the capacitor would be $$\frac{4.8 \text{ pF}}{2}(210 \text{ mV}^2 - 190 \text{ mV}^2) = 19.2 fJ \quad (12)$$

By using a variable capacitor, 7.2 fJ=37.7% more energy is available with the same voltage drop of 20 mV from variable capacitance compared to fixed capacitor of the same capacitance.

The other benefit of voltage dependent capacitor is visible during the loading period of the switched mode regulator. Capacitance of the filter capacitor is increased if the loading pulse has voltage peaks that are effectively suppressed by increased filter capacitance. The voltage dependent quantum capacitance of graphene provides clear improvement in performance even with relatively small voltage variations.

Figure 13:
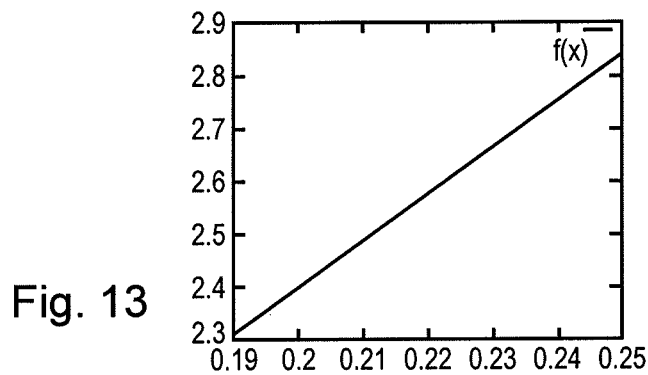
FIG. 13 illustrates another capacitance function of a simulated regulator circuit.

FIG. 13 shows another example using the capacitance function $$1pF(1+20V_1-5V_1^2) \quad (13)$$

with 190 mV-250 mV limits.

In this example, more benefits are achievable by making the voltage over the capacitor change by at least 100 mV, or (in other embodiments) even more. Fine tuning can be made by an LDO. If voltage variation would be between 190 mV and 250 mV, then the available energy will be:

$$\frac{1}{2}\{[1 \text{ pF}(1 + 20 \cdot 250 \text{ mV} - 5 \cdot (250 \text{ mV})^2)] \cdot 250 \text{ mV}^2 - [1 \text{ pF}(1 + 20 \cdot 190 \text{ mV} - 5 \cdot (190 \text{ mV})^2)] \cdot 190 \text{ mV}^2\} =$$
$$\frac{1}{2}1 \text{ pF}[(1 + 5 - 0.3125) \cdot 250 \text{ mV}^2 - (1 + 3.8 - 0.1805) \cdot 190 \text{ mV}^2]$$

With fixed 4.8 pF capacitor the energy from 250 mV to 190 mV is:

$$\frac{4.8\text{pF}}{2}(250 \text{ mV}^2 - 190 \text{ mV}^2) = 63.4 fJ \quad (15)$$

The voltage dependent capacitor gives 50% more energy with the same voltage drop from 250 mV to 190 mV than fixed 4.8 pF capacitor.

FIG. 14 illustrates voltage over output capacitor ($V_1$—saw tooth) and current from input capacitor ($V_2$ peaks), when C1=0.1 pF, C2=3 pF and all switches and interconnection between C1 and C2 have 2Ω serial resistance. Load 50Ω to ground and differential 50Ω+50Ω load with 100 fs timing difference to generate common-mode load.

It will be appreciated to the skilled reader that any mentioned apparatus/device/server and/or other features of particular mentioned apparatus/device/server may be provided by apparatus arranged such that they become configured to carry out the desired operations only when enabled, for example, switched on, or the like. In such cases, they may not necessarily have the appropriate software loaded into the active memory in the non-enabled (for example, switched off state) and only load the appropriate software in the enabled (for example, on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (for example, memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (for example, including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
an input port;
an output port;
one or more voltage regulator circuit components configured to provide for a change from an input voltage at the input port to an output voltage at the output port; and
one or more graphene capacitors configured to have a quantum capacitance that is dependent on the output voltage, wherein the one or more graphene capacitors provide smoothing to the output voltage,
wherein the smoothing is provided at least by a kinetic energy of one or more charge carriers in the one or more graphene capacitors,
wherein the one or more graphene capacitors have a substrate dopant configured to change a Fermi level relative to an un-doped substrate, and
wherein the substrate dopant and an amount of the substrate dopant are selected at design time to map a predetermined relationship between the quantum capacitance and a voltage across the one or more graphene capacitors.

2. The apparatus of claim 1, wherein at least one of the one or more graphene capacitors is provided at the output port to smooth the output voltage.

3. The apparatus of claim 1, wherein the output voltage is direct current.

4. The apparatus of claim 1, wherein the one or more voltage regulator circuit components comprise a plurality of switches configured to provide for switched charging of the one or more graphene capacitors to provide for smoothing of the output voltage.

5. The apparatus of claim 1, wherein the one or more voltage regulator circuit components comprise at least one non-graphene capacitor and a plurality of switches configured to provide for switched charging of the at least one non-graphene capacitor.

6. The apparatus of claim 1, wherein at least one of the one or more graphene capacitors is provided at the input port to at least enhance an efficiency of the smoothing of the output voltage.

7. The apparatus of claim 1, wherein the one or more voltage regulator circuit components comprise a low dropout regulator provided to at least enhance an efficiency of the smoothing of the output voltage.

8. The apparatus of claim 1, wherein the apparatus is one or more of: a voltage regulator, an integrated circuit for the voltage regulator, a first processor for the voltage regulator, an electronic device, and a second processor for the electronic device.

9. The apparatus of claim 1, wherein the output voltage comprises signalling.

10. The apparatus of claim 1, wherein the predetermined relationship mapped at design time includes at least a portion of a total capacitance proportional to $(1+20\,\text{ABS}(V)-5V^2)$, wherein V represents the voltage across the one or more graphene capacitors, and wherein ABS(V) represents the absolute value of V.

11. A method comprising:
receiving an input voltage at an input port;
changing the input voltage to an output voltage at an output port;
smoothing the output voltage using one or more graphene capacitors, the one or more graphene capacitors configured to have a quantum capacitance that is dependent on the output voltage; and
providing smoothing of the output voltage by at least a kinetic energy of one or more charge carriers in the one or more graphene capacitors,
wherein the one or more graphene capacitors have a substrate dopant configured to change a Fermi level relative to an un-doped substrate, and
wherein the substrate dopant and an amount of the substrate dopant are selected at design time to map a predetermined relationship between the quantum capacitance and a voltage across the one or more graphene capacitors.

12. The method of claim 11, wherein the predetermined relationship mapped at design time includes at least a portion of a total capacitance proportional to $(1+20\ ABS(V)-5V^2)$, wherein V represents the voltage across the one or more graphene capacitors, and wherein ABS(V) represents the absolute value of V.

13. A computer program product comprising a non-transitory computer readable medium encoded with instructions that, when executed by at least one processor, perform at least the following:
  determining a bias voltage to a graphene capacitor to provide smoothing to an output voltage at an output port, the graphene capacitor having a quantum capacitance that is dependent on at least the output voltage, the bias voltage determined based on at least:
    an input voltage at an input port, the output voltage, and one or more parameters of one or more voltage regulator circuit components configured to provide a change from the input voltage to the output voltage,
    wherein the smoothing to the output voltage is provided at least by a kinetic energy of one or more charge carriers in the graphene capacitor,
    wherein the one or more graphene capacitors have a substrate dopant configured to change a Fermi level relative to an un-doped substrate, and
    wherein the substrate dopant and an amount of the substrate dopant are selected at design time to map a predetermined relationship between the quantum capacitance and a voltage across the one or more graphene capacitors.

14. The computer program product of claim 13, wherein the predetermined relationship mapped at design time includes at least a portion of a total capacitance proportional to $(1+20\ ABS(V)-5V^2)$, wherein V represents the voltage across the one or more grapheme capacitors, and wherein ABS(V) represents the absolute value of V.

15. An apparatus comprising:
  at least one processor; and
  at least one memory including computer program code, the at least one processor, the at least one memory, and the computer program code configured to cause the apparatus to at least:
    determine a bias voltage to a graphene capacitor to provide smoothing to an output voltage at an output port, the graphene capacitor having a quantum capacitance that is dependent on at least the output voltage, the bias voltage determined based on at least:
      an input voltage at an input port, the output voltage, and one or more parameters of one or more voltage regulator circuit components configured to provide a change from the input voltage to the output voltage,
      wherein the smoothing to the output voltage is provided at least by a kinetic energy of one or more charge carriers in the graphene capacitor,
      wherein the one or more graphene capacitors have a substrate dopant, configured to change a Fermi level relative to an un-doped substrate, and
      wherein the substrate dopant and an amount of the substrate dopant are selected at design time to map a predetermined relationship between the quantum capacitance and a voltage across the one or more graphene capacitors.

16. A method comprising:
  determining a bias voltage to a graphene capacitor to provide smoothing to an output voltage at an output port, the graphene capacitor having a quantum capacitance that is dependent on at least the output voltage, the bias voltage determined based on at least:
    an input voltage at an input port, the output voltage, and one or more parameters of one or more voltage regulator circuit components configured to provide a change from the input voltage to the output voltage,
    wherein the smoothing to the output voltage is provided at least by a kinetic energy of one or more charge carriers in the graphene capacitor,
    wherein the one or more graphene capacitors have a substrate dopant configured to change a Fermi level relative to an un-doped substrate, and
    wherein the substrate dopant and an amount of the substrate dopant are selected at design time to map a predetermined relationship between the quantum capacitance and a voltage across the one or more graphene capacitors.

17. A computer program product comprising a non-transitory computer readable medium encoded with instructions that, when executed by at least one processor, perform at least the following:
  receiving an input voltage at an input port;
  changing the input voltage to an output voltage at an output port;
  smoothing the output voltage using one or more graphene capacitors, the one or more graphene capacitors configured to have a quantum capacitance that is dependent on the output voltage; and
  providing smoothing of the output voltage by at least a kinetic energy of one or more charge carriers in the one or more graphene capacitors,
  wherein the one or more graphene capacitors have a substrate dopant configured to change a Fermi level relative to an un-doped substrate, and
  wherein the substrate dopant and an amount of the substrate dopant are selected at design time to map a predetermined relationship between the quantum capacitance and a voltage across the one or more graphene capacitors.

* * * * *